(12) United States Patent
Yoshida et al.

(10) Patent No.: US 7,908,619 B2
(45) Date of Patent: Mar. 15, 2011

(54) BROADCASTING SYSTEM AND RECEPTION APPARATUS

(75) Inventors: Tadao Yoshida, Kanagawa (JP); Keiji Kanota, Kanagawa (JP); Hajime Yano, Kanagawa (JP); Hiroaki Oishi, Tokyo (JP); Junichi Yokota, Kanagawa (JP); Toyomi Fujino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1240 days.

(21) Appl. No.: 09/726,867

(22) Filed: Nov. 30, 2000

(65) Prior Publication Data
US 2001/0049822 A1  Dec. 6, 2001

(30) Foreign Application Priority Data
Dec. 1, 1999 (JP) .................................. 11-342561

(51) Int. Cl.
H04N 5/446 (2006.01)
(52) U.S. Cl. .................. 725/46; 725/28; 725/44; 386/1
(58) Field of Classification Search .................. 725/28, 725/34–35, 44–61, 131–134, 139–142, 88; 386/1, 83, 45, 46, 125, 126
See application file for complete search history.

(56) References Cited

U.S. PATENT DOCUMENTS

| | | | |
|---|---|---|---|
| 5,410,344 A | | 4/1995 | Graves et al. |
| 5,629,733 A | * | 5/1997 | Youman et al. .................. 725/53 |
| 5,758,257 A | | 5/1998 | Herz et al. |
| 5,798,785 A | | 8/1998 | Hendricks et al. |
| 5,859,662 A | * | 1/1999 | Cragun et al. ................. 725/137 |
| 6,005,597 A | | 12/1999 | Barrett et al. |
| 6,177,931 B1 | * | 1/2001 | Alexander et al. ............... 725/52 |
| 6,185,360 B1 | * | 2/2001 | Inoue et al. ..................... 386/46 |
| 6,266,664 B1 | * | 7/2001 | Russell-Falla et al. ....... 707/700 |
| 6,408,295 B1 | * | 6/2002 | Aggarwal et al. ............. 707/694 |
| 6,457,010 B1 | * | 9/2002 | Eldering et al. ....................... 1/1 |
| 6,581,207 B1 | * | 6/2003 | Sumita et al. ................... 725/46 |
| 6,614,987 B1 | * | 9/2003 | Ismail et al. .................... 386/83 |

FOREIGN PATENT DOCUMENTS

| | | |
|---|---|---|
| EP | 0 824 826 | 2/1998 |
| JP | 9 312811 | 12/1997 |
| JP | 11 220666 | 8/1999 |
| JP | 11 234612 | 8/1999 |
| WO | WO 9901984 A1 * | 1/1999 |

OTHER PUBLICATIONS

"Metabyte announces personalized TV software" Jan. 21, 1999, XP002154116.

* cited by examiner

*Primary Examiner* — Annan Q Shang
(74) *Attorney, Agent, or Firm* — Frommer Lawrence & Haug LLP; William S. Frommer; Thomas F. Presson

(57) ABSTRACT

A broadcasting system 1 provides a digital content to be broadcast with an attribute vector A thereof. A filter 12 is assigned with a selection vector S indicating user's taste. The filter 12 performs a standardized inner product operation between the selection vector S and the attribute vector A for selecting and recording broadcast programs.

$$A=(a_1, a_2, a_3, \ldots, a_n)$$

$$S=(s_1, s_2, s_3, \ldots, s_n)$$

$$P = \frac{A \cdot S}{|A| \, |S|}$$

11 Claims, 1 Drawing Sheet

BROADCASTING SYSTEM AND RECEPTION APPARATUS

BACKGROUND OF THE INVENTION

1. Technical Field

The present invention relates to a broadcasting system for broadcasting digital contents such as video and music, and also to a reception apparatus thereof.

2. Prior Art

In recent years, digital television broadcasting is developing for broadcasting various programs such as videos, music, games, computer data, and the like to many users by means of cable broadcasting, satellite broadcasting, ground waves, and the like.

Using this digital television broadcasting, a user need not purchase or rent recording media such as optical disks, magnetic tapes, and the like which store programs such as movies, music, games, computer data, and the like. It is possible to eliminate inconvenience of acquiring such programs.

In this digital broadcasting system, however, a broadcasting station unilaterally selects time slots and contents of programs to be broadcast. Users cannot select time slots and contents of programs they wish at their discretion.

The user needs to enjoy a desired program at a convenient time slot using a time-shift feature, a library feature, and the like provided by a videotape recorder. Even if using these videotape recorder features, the user at least needs to reserve desired programs. Operations for the reservation are too complicated and inconvenient for users to choose from all the broadcast programs.

BRIEF SUMMARY OF THE INVENTION

The present invention has been made in consideration of the foregoing. It is therefore an object of the present invention to provide a broadcasting system and a reception apparatus with improved convenience for enjoying digital contents according to user preferences.

In order to solve the above-mentioned problems, a broadcasting system according to the present invention comprises: a broadcasting station for broadcasting a digital content together with attribute information indicating an attribute thereof; and a plurality of reception apparatuses having reception means for receiving said digital content and attribute information broadcast from a broadcasting station, a recording medium for recording received digital contents and attribute information, output means for outputting received digital contents, and selection means for selecting digital contents by comparing selection information indicating users's taste with attribute information assigned to digital contents, wherein said attribute information is expressed with an n-dimensional vector A comprising attribute items as elements each indicative of attribute intensities for a digital content; said selection information is expressed with an n-dimensional vector S comprising user's taste items as elements each indicative of taste intensities; item types and orders for said attribute information and said selection information correspond to those for an attribute information's vector A and a selection information's vector S; and said reception apparatus's selection means performs an inner product operation between an attribute information's vector A attached to a broadcast digital content and a selection information's vector S and determines whether to select that digital content based on an inner product operation result.

Such a broadcasting system provides digital contents to be broadcast with the corresponding attribute information. The system selects digital contents matching the users's taste from the broadcast digital contents based on this attribute information and selection information indicating the users's taste. The broadcasting system records the selected digital contents on a recording medium, then allows users to replay the recorded digital contents or choose from these according to users's taste.

The above-mentioned attribute information is expressed with an n-dimensional vector A. This vector comprises elements each of which represents intensity of an attribute for each item when digital content attributes are categorized into items. The above-mentioned selection information is expressed with an n-dimensional vector S. This vector comprises elements each of which represents intensity of a taste for each item when users's tastes are categorized into items. The attribute information and the selection information contain item types and orders so defined that these item types and orders correspond to each other for the attribute information vector A and the selection information vector S. Based on the attribute information and the selection information expressed with these vectors, the above-mentioned selection means for the reception apparatus performs an inner product operation between the attribute information's vector A and the selection information's vector S. Based on an inner product operation result, the system determines whether to select the digital contents.

In the above-mentioned broadcasting system, the selection means of each of the plurality of reception apparatuses finds a selection value P based on the following equation and selects the digital content based on a size of the selection value P as follows:

$$A = (a1, a2, a3, \ldots, an)$$

$$S = (s1, s2, s3, \ldots, sn)$$

$$P = \frac{A \cdot S}{|A| \, |S|}$$

where $$A \cdot S = \sum_{k=1}^{n} a_k S_k$$

$$|A| = \sqrt{\sum_{k=1}^{n} a_k^2}$$

$$|S| = \sqrt{\sum_{k=1}^{n} S_k^2}$$

in which neither A nor S is a zero vector.

A reception apparatus according to the present invention comprises: reception means for receiving said digital content and attribute information broadcast from a broadcasting station; recording medium for recording received digital content and attribute information; output means for outputting received digital content; and selection means for selecting a digital content by comparing selection information indicating user's taste with attribute information attached to the digital content, wherein said attribute information is expressed with an n-dimensional vector A comprising attribute items as elements each indicative of attribute intensities for a digital content; said selection information is expressed with an n-dimensional vector S comprising user's taste items as elements each indicative of taste intensities; item types and orders for said attribute information and said selection information correspond to those for an attribute information's vector A and a selection information's vector S; and said selection means performs an inner product operation between an attribute information's vector A attached to a broadcast digital content and a selection information's vector S and determines whether to select that digital content based on an inner product operation result.

The reception apparatus receives digital contents provided with the attribute information. Based on this attribute information and selection information indicating users's taste, the system selects digital contents matching the users's taste from the broadcast digital contents. The reception apparatus allows users to record selected digital contents on storage media and replay them or to replay recorded digital contents according to the users's taste.

The above-mentioned attribute information is expressed with an n-dimensional vector A. This vector comprises elements each of which represents intensity of an attribute for each item when digital content attributes are categorized into items. The above-mentioned selection information is expressed with an n-dimensional vector S. This vector comprises elements each of which represents intensity of a taste for each item when users's tastes are categorized into items. The attribute information and the selection information contain item types and orders so defined that these item types and orders correspond to each other for the attribute information vector A and the selection information vector S. Based on the attribute information and the selection information expressed with these vectors, the selection means for the reception apparatus performs an inner product operation between the attribute information's vector A and the selection information's vector S. Based on an inner product operation result, the system determines whether to select the digital contents.

The broadcasting system and the reception apparatus according to the present invention provide digital contents to be broadcast with the corresponding attribute information. The system selects digital contents matching the users's taste from the broadcast digital contents based on this attribute information and selection information indicating the users's taste. The broadcasting system and the reception apparatus record the selected digital contents on a recording medium, then allows users to replay the recorded digital contents or choose from these according to users's taste.

The broadcasting system and the reception apparatus according to the present invention automatically select digital contents based on the selection information indicating users's tastes. Convenience is improved by eliminating complicated operations for selecting desired digital contents from many ones. It is possible to record only digital contents needed for the time-shift feature, effectively using recording media.

The broadcasting system and the reception apparatus according to the present invention express the attribute information and the selection information with vectors. The selection means performs an inner product operation between the attribute information's vector A and the selection information's vector S. Based on an inner product operation result, the system determines whether to select the digital contents. The broadcasting system and the reception apparatus according to the present invention can easily select digital contents matching users's tastes and precisely reflect users's tastes.

DETAILED DESCRIPTION OF THE INVENTION

Figure 1:
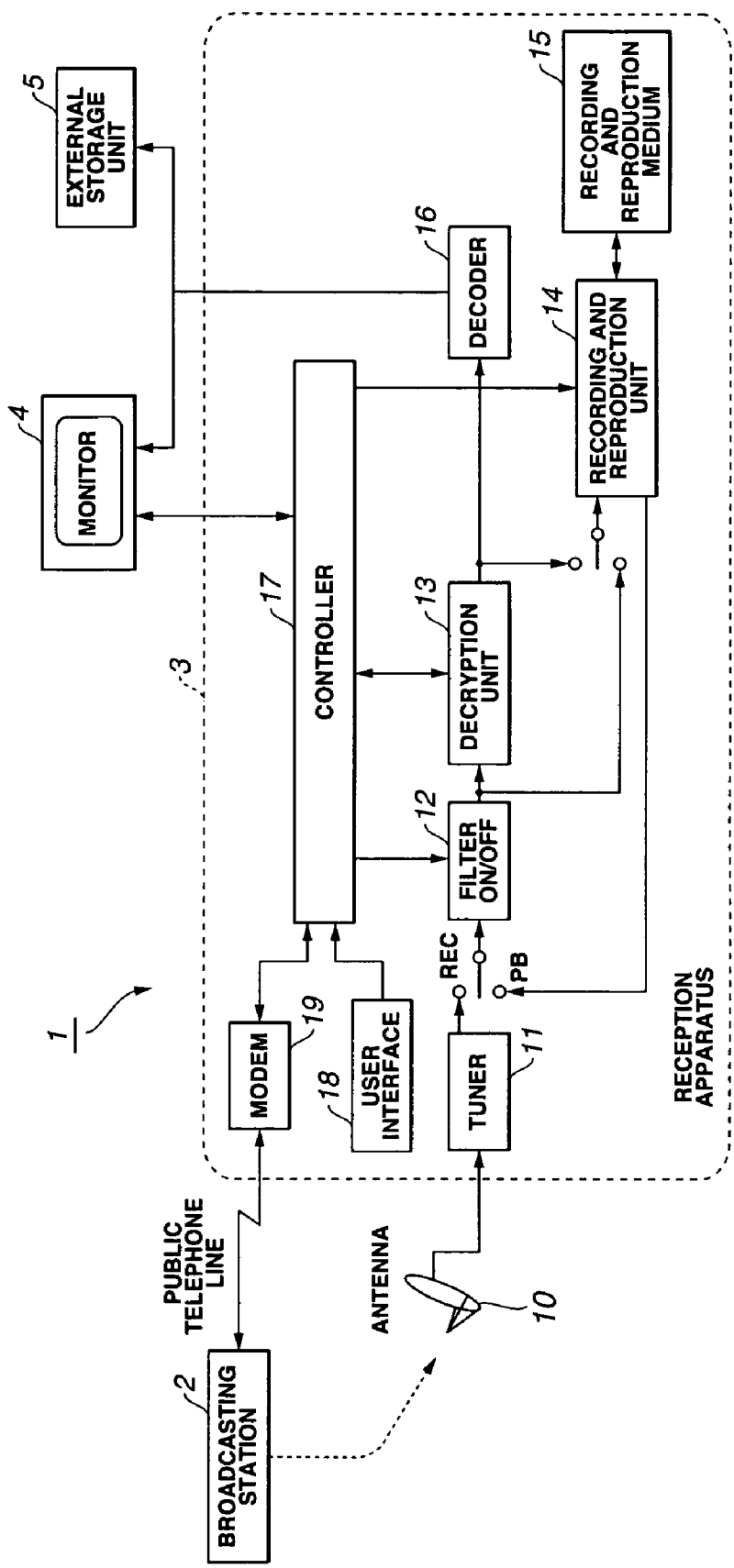
FIG. 1 shows a configuration of a digital broadcasting system according to an embodiment of the present invention.

An embodiment of the present invention will be described in further detail with reference to the accompanying drawing.

The following describes the embodiment of the present invention with reference to FIG. 1.

A digital broadcasting system 1 according to the embodiment of the present invention comprises a broadcasting station 2, a reception apparatus 3, a monitor 4 connected to the reception apparatus 3, and an external storage unit 5.

The reception apparatus 3 comprises an antenna 10, a tuner 11, a filter 12, a decryption unit 13, a recording and reproduction unit 14, a recording and reproduction medium 15, a decoder 16, a controller 17, a user interface unit 18, and a modem 19.

The broadcasting station 2 broadcasts digital data using, say, satellite broadcasting, cable networks, ground wave broadcasting, and the like. Digital data to be broadcast includes various programs such as movies, music, television programs, game data, computer data, commercial films, and the like, and an electronic program guide (EPG). An EPG lists title information about programs to be broadcast and broadcasting channels. Each program is provided with attribute information which indicates an attribute of that program.

The broadcasting station 2 broadcasts digital data by compressing it using, say, the MPEG-2 method. The broadcasting station 2 encrypts digital data and attribute information to be broadcast by using a specified encryption key.

The attribute information describes program attributes comprising various values and information including program genres such as news and sports, performers, keywords, trends, producers, popularities, charges, and the like needed for selecting information and determining tastes. The broadcasting station 2 describes values and information specific to each program for each attribute in the attribute information.

The reception apparatus 3 receives digital data broadcast from the broadcasting station 2 by using, say, the antenna 10. The tuner 11 demodulates the received signal and applies an error correction and the like to that signal. The demodulated digital data is sent to the filter 12.

The filter 12 is supplied with digital data comprising a program and attribute information from the tuner 11 or the recording and reproduction unit 14. The filter 12 is provided with the selection information indicating the users's taste. The filter 12 compares this selection information with the attribute information included in each program. Then, the filter 12 filters the supplied programs and outputs programs which match the users's taste. The controller turns on or off the filter 12 to determine whether to perform filtering. When no filtering is performed, all input programs are output.

The decryption unit 13 is supplied with digital data from the filter 12 and decrypts the digital data using a specified encryption key. Only a registered user at the broadcasting station 2 can own this encryption key. The digital data decrypted in the decryption unit 13 is sent to the recording and reproduction unit 14 or the decoder 16.

The recording and reproduction unit 14 records and reproduces digital data on the recording and reproduction medium

15. Basically, encrypted digital data is supplied and is recorded as encrypted data on the recording and reproduction medium 15. On the recording and reproduction medium 15, the recording and reproduction unit 14 may record digital data for which charging or the like is complete or for which a cipher is decrypted in freeware and the like.

Under control of the controller 17, the recording and reproduction unit 14 reads digital data from the recording and reproduction medium 15 and transfers it to the filter 12.

The decoder 16 is supplied with digital data which is decrypted by the decryption unit 13. The decoder 16 demodulates a program compressed with the MPEG-2 method to generate baseband-based video data, audio data, computer data, and the like. According to the user's control, the decoder 16 outputs the demodulated program to the monitor 4 or the external storage unit 5.

The controller 17 controls the components such as the tuner 11, the filter 12, the decryption unit 13, the recording and reproduction unit 14, the decoder 16, the user interface unit 18, and the modem 19 in an integrated manner.

The user interface unit 18 is an input device such as a keyboard and a mouse and a control unit thereof. For example, the user interface unit 18 is used for selecting GUI components displayed on the monitor 4 or configuring settings via the monitor 4.

The modem 19 connects the reception apparatus 3 with the broadcasting station 2 or a specified management station via a public telephone line. The modem 19 uploads data transmitted from the reception apparatus 3 to the broadcasting station 2 or the specified management station, The reception apparatus 3 receives programs broadcast from the broadcasting station 2. The reception apparatus 3 receives the broadcast programs at the antenna 10 and uses the tuner 11 to apply processing such as demodulation and error correction to the programs. For replaying a broadcast program in realtime, the filter 12 selects that program. The decryption unit 13 decrypts the program. The decrypted program is sent to the decoder 16, is expanded in the decoder 16, and then is displayed on, say, the monitor 4. For replaying broadcast digital contents using a time-shift feature, the received program is transmitted to the recording and reproduction unit 14 from the filter 12, and then is recorded in the recording and reproduction medium 15. At a user-specified time, the program is reproduced from the recording and reproduction medium 15. The filter 12 selects the program. That program is then decrypted in the decryption unit 13. The decrypted program is sent to the decoder 16, is expanded in the decoder 16, and then is displayed on, say, the monitor 4.

In this reception apparatus 3, the filter 12 selects received programs. Only a program which matches the users's taste is stored in the recording and reproduction medium 15. During a realtime or time-shift operation, only a program which matches the users's taste is output via the decoder 16.

Specifically, the selection information is assigned to the filter 12 of the reception apparatus 3. The filter 12 compares the attribute information attached to a program with the internally defined selection information. The filter 12 selects only the attribute information matching the selection information and selects a program assigned with the selected attribute information. The controller 17 specifies whether the filter 12 performs a selection operation. When turned on, the filter filters programs. When turned off, the filter does not filter programs.

For example, there may be the case where the reception apparatus 3 is used for replaying a received program at another time slot, namely replaying a time-shifted program. When the filter 12 is turned on, only a program selected by the filter 12 is stored in the recording and reproduction medium 15. The reception apparatus 3 need not store all broadcast programs, effectively using the capacity of the recording and reproduction medium 15. The reception apparatus 3 stores programs which match the users's taste even if a user does not reserve these programs. This eliminates a complicated operation of selecting desired programs from all broadcast programs.

When replaying received programs in a time-shift manner, for example, the reception apparatus 3 turns off the filter 12 to store all received programs on the recording and reproduction medium 15. During replay, the reception apparatus 3 turns on the filter 12 to output only programs selected by the filter 12 via the decoder 16.

The digital contents to be broadcast contain an EPG. The reception apparatus 3 displays the EPG to allow users to easily select programs for a realtime replay. The EPG shows title information as a list of choices which are understandable to users as program contents. The EPG comprises, say text data, font data, image data, graphic data, if needed, motion picture data, and the like.

When the controller 17 displays the EPG, the reception apparatus 3 modifies the EPG's program titles in accordance with the users's taste. When there is a program which matches the selection information and the attribute information defined for the filter 12, the controller displays the title information indicating that program in a state differing from the other programs. The user uses the user interface unit 18 to select the title information displayed on the EPG. Accordingly, the reception apparatus 3 allows the user to easily select information for replaying programs during realtime broadcasting.

It is possible to use the EPG when reproducing programs after they are stored in the recording and reproduction medium 15. The EPG is stored together with programs in the recording and reproduction medium 15. This EPG can be used for selecting programs to be reproduced during a time-shift operation. There is the case where the recording and reproduction medium 15 contains a program which corresponds to the selection information and the attribute information defined for the filter 12. In this case, the user can easily select information during a time-shift operation by displaying the title information indicating that program in a state differing from the other programs.

When the apparatus starts for use, predetermined GUI choices are placed in the selection information defined for the filter 12. Alternatively, a user specifies any available parameter values for the selection information. The selection information specified for the filter 12 may be modified as needed.

The selection information defined for the filter 12 may be changed for recording and reproduction. For example, there is the case where the selection information is provided for the number of members of the family to record received programs. In this case, the selection information is specified by OR'ing between a plurality of pieces of the selection information. The apparatus records only a program provided with attribute information matching the OR'ed selection information. When recorded programs are reproduced, the apparatus checks the selection information specified for one user and the attribute information about the programs recorded in the recording and reproduction medium 15. Based on these two types of information, the apparatus reproduces a program which matches that user's taste.

The controller 17 computes the attribute information about programs replayed by users after startup of the apparatus and analyzes each user's taste. Based on an analysis result, the controller 17 modifies a weight of each parameter value for the selection information assigned to the filter 12, thus optimizing the selection information for users's taste.

As mentioned above, the reception apparatus 3 compares the selection information with the attribute information and uses a program which matches the user's taste. Contrarily, the filter 12 may be assigned with selection information containing parameters indicating that the user does not want to replay programs. This can positively eliminate programs not preferred by users.

Replaying a program is charged when the decryption unit 13 decrypts the program during replay. When the program is decrypted, the charging data is transferred to the broadcasting station 2 and the specified management station via the modem 19. The broadcasting station 2 and the specified management station charge each user based on the transferred charging data. When a user downloads software or transacts a purchase of merchandise on the screen, the corresponding charging data is transferred to the broadcasting station and the specified management station.

The reception apparatus 3 may transfer selection information defined for the filter 12 or analyzed replay results to the broadcasting station 2 or the specified management station via the modem 19. In this case, the broadcasting station 2 or the specified management station can recognize each user's taste or replay results. By recognizing users's taste or replay results, it is possible to broadcast programs which match users's taste more suitably. If programs are broadcast to users with various tastes, it is possible to effectively constitute programs most common to users. It is also possible to constitute specific programs for minor users so that requests from minor users can be satisfied.

Program contents include advertising information. The reception apparatus 3 selects received advertising information using the attribute information attached to the advertising information. The reception apparatus 3 may provide a recording area dedicated to advertisement in the recording and reproduction medium 15. The reception apparatus 3 may select and record advertising information matching the users's taste. During realtime reception, the reception apparatus 3 may replay the advertising information recorded in the dedicated advertisement recording area within a specified time limit for advertisement. By matching the advertising information with the users's taste, not only can users obtain necessary information, but broadcasters can also increase added values of the advertisement.

As mentioned above, the digital broadcasting system 1 according to the embodiment of the present invention automatically selects programs based on the selection information indicating users's taste. This eliminates the need for selecting desired programs from many and increases convenience. Only necessary programs can be recorded during a time-shift operation, allowing the effective use of storage media. The digital broadcasting system 1 displays the title information about realtime broadcast programs and the attribute information. This improves interactivity and convenience of realtime replay and recording by users.

The following describes the attribute information given to a program and the selection information defined for the filter 12 in further detail. Also described is a concrete method of filtering through the use of the filter 12.

The digital broadcasting system 1 processes the attribute information and the selection information as vector information. The following description assumes the attribute information to be an n-dimensional (n≧2) attribute vector A and the selection information to be an n-dimensional (n≧2) selection vector S.

Specifically, the n-dimensional attribute vector A is expressed as equation (1) below.

$$A = (a_1, a_2, a_3, \ldots, a_n) \quad (1)$$

In this equation, $a_1$ through $a_n$ are elements of the attribute vector A and indicate intensities of program attributes. The order of attribute items and the number of these items (n) are predetermined in the attribute vector A.

A given program, say, a movie, is provided with the following attribute vector A which contains the following attribute items ($a_1$ through $a_n$). The order and the number of these items are predetermined. Each of these items is assigned a specific value. The thus prescribed attribute vector A is attached to the corresponding program for broadcasting. The order of attribute items is common to the digital broadcasting system 1. When another program is broadcast, that order is unchanged. Only values allocated to items change.

$$A = (5, 2, 1, -3, -4, \ldots, 0, 0, 8)$$

Attribute Items
Movie→8
Drama→0
Sports→0
Artistic→−4
Musical→−3
Dramatic→−1
Horror→−2
Amusing→5

Specifically, the n-dimensional selection vector A is expressed as equation (2) below.

$$S = (s_1, s_2, s_3, \ldots, s_n) \quad (2)$$

In this equation, $s_1$ through $s_n$ are elements of the selection vector S and indicate intensities of attribute attributes indicating the user's taste. The order of attribute items and the number of these items (n) in the selection vector S are same as those for elements in the attribute vector. This selection vector S is defined for the filter 12 in the reception apparatus 3.

The selection vector S indicating the user's taste is generated, say, by averaging a plurality of programs reproduced by the user. For example, it is assumed that the user selected 50 replayed programs. In this case, the selection vector S can be generated for each selected program by averaging attribute vectors A1 through A50.

$$A_1 = (5, 2, 1, -3, -4, \ldots, 0, 0, 8)$$
$$A_2 = (3, 3, 5, 1, 0, \ldots, 0, 0, 8)$$
$$A_3 = (1, 2, 3, -1, 3, \ldots, 0, 8, 0)$$
$$\vdots$$
$$A_{50} = (2, 3, 4, -1, 3, \ldots, 8, 0, 0)$$
$$S = \frac{1}{50} \sum_{k=1}^{50} A_k = (2.1, 3.2, -1.1, 0.5, -4, \ldots, 0.1, 0.3, 0.2)$$

When the number of programs to be selected is assumed to be M, the selection vector S is found in equation (3) as follows.

$$S = \frac{1}{M} \sum_{k=1}^{M} A_k \quad (3)$$

It is assumed that the k-th program selected by the user will have the attribute vector A as follows.

$$A_k=(a_{1k}, a_{2k}, a_{3k}, \ldots, a_{nk})$$

The following equation may be used to find the selection vector S by restricting the number of programs used for finding this selection vector out of a plurality of reproduced programs.

$$S = \frac{1}{M}\sum_{k=L-M+1}^{M} A_k$$

In this equation, M denotes the number of windows for finding the selection vector S; and L is a start point for selecting programs for finding the selection vector S. It is assumed that the k-th program selected by the user will have the attribute vector A as follows.

$$A_k=(a_{1k}, a_{2k}, a_{3k}, \ldots, a_{nk})$$

Not only reproduced programs, but also user-reserved programs may be used for a plurality of attribute vectors A in order to find this selection vector S. During realtime reproduction, a program may be reproduced for a short time and may be immediately changed to another program. Such a program is assumed to be little interested or inadvertently selected and is not used for finding the selection vector S. Namely, the selection vector S is generated by using the attribute vector A for a program which is reproduced for a specified time or longer. Further, the selection vector S may be generated by changing weights for a reserved program and a realtime reproduced program. For example, the selection vector S may be generated as follows by using a constant P for the reserved program and a constant R for the realtime reproduced program.

$$S=PS_P+RS_R$$

In this equation, $S_u$ is a selection vector found from the attribute vectors A for a plurality of reserved programs; and $S_v$ is a selection vector found from the attribute vectors A for a plurality of realtime reproduced programs.

Note that generating the selection vector S is not limited to this method. A user can select any generation method.

The following describes how to select broadcast programs.

It is assumed that a broadcast program contains the attribute vector A in equation (4) as follows.

$$A=(3, 1.1, 4, -1, 2.5, \ldots, 0, 0, 8) \quad (4)$$

At this time, the following operation in equation (5) is performed for determining whether to record the program in the recording and reproduction medium 15.

$$P = \frac{A \cdot S}{|A| \, |S|} \quad (5)$$
$$= \frac{3*2.3+1.1*3.2*4*(-1.1) \ldots +8*0.2}{\sqrt{3^3+1.1^2+4^2+\ldots 8^2}\sqrt{2.3^2+3.2^2+(-1.1)^2+\ldots +0.2^2}}$$

A decision is made according to the found selection value P.

The meaning of the selection value P is described below.

When an angle è is assumed to be formed between the attribute vector A and the selection vector S in a vector space, the equation (6) shows an internal product between the attribute vector A and the selection vector S.

$$A \cdot S=|A||S|\cos \theta \quad (6)$$

where A·S is an internal product between A and S.

Accordingly, $\cos \theta$ is found in equation (7) as follows.

$$\therefore \cos\theta = \frac{A \cdot S}{|A| \, |S|} \quad (7)$$

Namely, the selection value P indicates $\cos \theta$.

When the attribute vector A and the selection vector S indicate the same direction, the result is P>0 (case 1). When the attribute vector A crosses the selection vector S, the result is P=0 (case 2). When the attribute vector A and the selection vector S are directed opposite to each other, the result is P<0 (case 3).

It is possible to make the following assumptions about the relationship between a program assigned with the attribute vector A and a user having a taste pattern indicated by the selection vector S.

In case 1, the user is assumed to be interested in the program or have the similar taste. This tendency is assumed to be stronger as the value approaches the maximum value of 1.

In case 2, the user is assumed to be uninterested in the program.

In case 3, the user is assumed not to like the program positively or is assumed to dislike it. This tendency is assumed to be stronger as the value approaches the minimum value of −1.

The reception apparatus 3 sets the filter 12 so that the program is recorded under the condition of selection value P>0.3, for example. Consequently, it is possible to record much interesting programs without recording less interesting, uninterested, or dislike programs.

As mentioned above, the digital broadcasting system 1 uses the attribute information and the selection information expressed in vectors to select programs to be recorded or reproduced according to values resulting from an inner product operation. Thus, it is possible to easily select digital contents matching users's taste and reflect the users's taste correctly.

The above-mentioned example records programs in the recording and reproduction medium 15 when the selection value P exceeds a specified value. Selection of programs is not limited to this method. It may be preferable to overwrite or delete a program with the minimum selection value P found by attribute vectors A and selection vectors S of the recorded programs when the recording and reproduction medium 15 becomes full to leave no free area. Further, it may be preferable to compare the smallest selection value P from programs recorded in the recording and reproduction medium 15 with the selection value P for a newly received program and determine whether to record this new program.

When a plurality of users uses the reception apparatus 3, the filter 12 is assigned with the selection vector for each user.

The attribute vector A and the selection vector S comprise n-dimensional elements. It may be preferable to extract necessary elements from n elements and generate an m-dimensional (m<n) vector for selecting programs.

What is claimed is:

1. A broadcasting system comprising:
a broadcasting station for broadcasting digital contents and attribute information indicating an attribute thereof and an electronic program guide (EPG); and
a plurality of reception apparatuses having:
reception means for receiving said digital contents and said attribute information broadcast from the broadcasting station, output means for outputting the received digital contents, and selection means for allowing a user to select the digital contents via a filtering process by comparing selection information indicating user preferences with attribute information assigned to the digital contents, said selection information is expressed with an n-dimensional vector S comprising user preference items as elements, wherein each element identifies a preference intensity, wherein an element of vector S identifies a positive value as a preference intensity when the user has demonstrated a positive preference for the element and indentifies a negative value as a preference intensity when the user has demonstrated a negative preference for the element, and wherein said plurality of reception apparatuses include a selection means for: (1) performing a calculation between a vector A related to the attribute information and the vector S; and (2) determining whether to select the digital content based on the result of the calculation, wherein Vector S is generated by using Vector A for a program which is reproduced for a specified period of time or longer, and wherein Vector S is generated by changing a weighting factor for a reserved program and a realtime reproduced program.

2. A reception apparatus comprising:

reception means for receiving digital contents and attribute information transmitted from a content provider;

output means for outputting the received digital content; and selection means for allowing a user to select the digital contents via a filtering process by comparing selection information indicating user preferences with attribute information related to the digital content, said selection information is expressed with an n-dimensional vector S comprising user preference items as elements, wherein each element identifies a preference intensity, wherein an element of vector S identifies a positive value as a preference intensity when the user has demonstrated a positive preference for the element and indentifies a negative value as a preference intensity when the user has demonstrated a negative preference for the element, and wherein said selection means performs a calculation between a vector A related to the attribute information and the vector S, and determines whether to select the digital content based on the result of the calculation wherein Vector S is generated by using Vector A for a program which is reproduced for a specified period of time or longer, and wherein Vector S is generated by changing a weighting factor for a reserved program and a realtime reproduced program.

3. The reception apparatus according to claim 2, wherein said selection means finds a selection value P based on the following equation and selects the digital content based on a size of the selection value P as follows:

$$A=(a1, a2, a3, \ldots, an)$$

$$S=(s1, s2, s3, \ldots, sn)$$

$$P = \frac{A \cdot S}{|A| \, |S|}$$

where $$A \cdot S = \sum_{k=1}^{n} a_k S_k$$

$$|A| = \sqrt{\sum_{k=1}^{n} a_k^2}$$

$$|S| = \sqrt{\sum_{k=1}^{n} S_k^2}$$

in which neither A nor S is a zero vector.

4. The reception apparatus according to claim 2, wherein said selection information's vector S is found from a vector A of attribute information attached to a plurality of digital contents selected by the user.

5. The reception apparatus according to claim 4, wherein said selection information's vector S is found according to the following equation:

$$S = \frac{1}{M} \sum_{k=1}^{M} A_k$$

where M is assumed to be a number of digital contents selected by the user and an attribute vector for the K-th digital content selected by the user is assumed to be: Ak=(a1k, a2k, a3k, . . . , ank).

6. The reception apparatus according to claim 4, wherein said selection information's vector S is found according to the following equation:

$$S = \frac{1}{M} \sum_{k=L-M+1}^{L} A_k$$

where M is assumed to be a number of windows for finding a vector S, L is assumed to be a start point for selecting the plurality of digital contents for finding the vector S, and an attribute vector for the K-th digital content selected by the user is assumed to be: Ak=(a1k, a2k, a3k, . . . , ank).

7. The reception apparatus according to claim 4, wherein said selection information's vector S is found by averaging vectors A for attribute information attached to the plurality of digital contents reproduced by the user for a specified time.

8. The reception apparatus according to claim 4, wherein said selection information's vector S is found by averaging vectors A for attribute information attached to the plurality of digital contents reserved by the user.

9. The reception apparatus according to claim 4, wherein said selection information's vector S is found by averaging vectors A for attribute information attached to the plurality of digital contents reproduced by the user for a specified time, averaging vectors A for attribute information attached to the plurality of digital contents reserved by the user, assigning a weight to each average, and combining the weights.

10. The reception apparatus according to claim 2, wherein said selection means selects the digital content based on a vector S of the selection information corresponding to a plurality of users.

11. A reception method comprising:
- receiving digital contents and attribute information transmitted from a content provider;
- outputting the received digital content;
- allowing a user to select the digital contents via a filtering process by comparing selection information indicating user preferences with attribute information related to the digital content;
- expressing the selection information with an n-dimensional vector S comprising user preference items as elements,
- identifying a preference intensity for each element
- wherein an element of vector S identifies a positive value as a preference intensity when the user has demonstrated a positive preference for the element and indentifies a negative value as a preference intensity when the user has demonstrated a negative preference for the element, and
- performing a calculation between a vector A related to the attribute information and the vector S; and
- determining, based on calculation, whether to select the digital content,
- wherein Vector S is generated by using Vector A for a program which is reproduced for a specified period of time or longer, and
- wherein Vector S is generated by changing a weighting factor for a reserved program and a realtime reproduced program.

* * * * *